(12) United States Patent
Cai et al.

(10) Patent No.: US 9,573,347 B2
(45) Date of Patent: Feb. 21, 2017

(54) THERMOPLASTIC ELASTOMER WITH DESIRABLE GRIP ESPECIALLY DURING WET CONDITIONS

(75) Inventors: Kevin G. Cai, Cumberland, RI (US); Darnell C. Worley, II, Uxbridge, MA (US); Gregory J. Anderson, North Kingstown, RI (US)

(73) Assignee: TEKNOR APEX COMPANY, Pawtucket, RI (US)

( * ) Notice: Subject to any disclaimer, the term of this patent is extended or adjusted under 35 U.S.C. 154(b) by 1232 days.

(21) Appl. No.: 12/653,463

(22) Filed: Dec. 15, 2009

(65) Prior Publication Data

US 2011/0143112 A1 Jun. 16, 2011

(51) Int. Cl.
| | |
|---|---|
| *B32B 25/14* | (2006.01) |
| *B32B 7/02* | (2006.01) |
| *B32B 15/08* | (2006.01) |
| *C08L 53/02* | (2006.01) |
| *C08L 3/02* | (2006.01) |

(52) U.S. Cl.
CPC .............. *B32B 25/14* (2013.01); *B32B 7/02* (2013.01); *B32B 15/08* (2013.01); *C08L 53/025* (2013.01); *B32B 2509/00* (2013.01); *C08L 3/02* (2013.01); *Y10T 428/24983* (2015.01)

(58) Field of Classification Search
CPC ........ B32B 7/02; B32B 25/14; B32B 2509/00; B32B 15/08; C08L 53/025; Y10T 428/24983
See application file for complete search history.

(56) References Cited

U.S. PATENT DOCUMENTS

| | | | |
|---|---|---|---|
| 4,871,799 A | 10/1989 | Kobayashi et al. | |
| 5,314,940 A | 5/1994 | Stone | |
| 5,445,657 A | 8/1995 | Durand et al. | |
| 5,981,649 A | 11/1999 | Hiraoka et al. | |
| 6,060,552 A | 5/2000 | Kaido | |
| 6,372,855 B1 | 4/2002 | Chino et al. | |
| 7,150,919 B2 | 12/2006 | Ajbani et al. | |
| 7,264,868 B2 | 9/2007 | Ajbani et al. | |
| 2004/0059069 A1 | 3/2004 | Grimm et al. | |
| 2004/0132907 A1* | 7/2004 | Nakamura et al. ............. | 525/88 |
| 2004/0171759 A1 | 9/2004 | Lange et al. | |
| 2006/0223945 A1 | 10/2006 | Hollingshurst et al. | |
| 2007/0032320 A1 | 2/2007 | Laliberty et al. | |
| 2007/0037908 A1 | 2/2007 | Pille-Wolf | |
| 2007/0129477 A1 | 6/2007 | Weng et al. | |
| 2008/0005930 A1 | 1/2008 | Skirrow | |
| 2008/0009579 A1* | 1/2008 | Gong et al. .................... | 524/445 |
| 2008/0271344 A1 | 11/2008 | Skirrow | |
| 2008/0281021 A1 | 11/2008 | Waddell et al. | |
| 2009/0018250 A1 | 1/2009 | Carcich | |
| 2011/0160364 A1* | 6/2011 | Toyohara et al. ............. | 524/117 |

FOREIGN PATENT DOCUMENTS

| | | | |
|---|---|---|---|
| DE | 19624236 A1 | | 1/1998 |
| WO | 98/44063 A1 | | 10/1998 |
| WO | WO2008013316 | * | 1/2008 |
| WO | 2008/103329 A2 | | 8/2008 |
| WO | 2009/086519 A2 | | 7/2009 |

\* cited by examiner

*Primary Examiner* — Samir Shah
(74) *Attorney, Agent, or Firm* — Hudak, Shunk & Farine Co. LPA

(57) ABSTRACT

Thermoplastic elastomer compositions having a desirable soft touch feel to skin, and in particular grip, especially during wet, soapy and humid conditions. In one embodiment, the composition is part of a composite system, wherein the composition is connected, for example molded, overmolded or co-extruded to a substrate, such as a thermoplastic, glass or metal. The compositions and composites are suitable for use wherever desirable feel and grip are needed, such as handles or grips of household or industrial items.

16 Claims, 1 Drawing Sheet

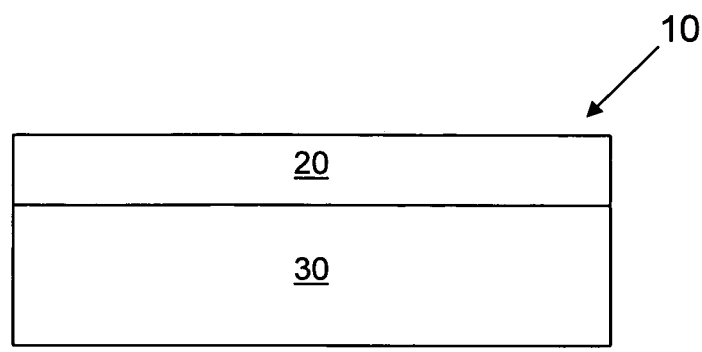

THERMOPLASTIC ELASTOMER WITH DESIRABLE GRIP ESPECIALLY DURING WET CONDITIONS

FIELD OF THE INVENTION

The present invention relates to thermoplastic elastomer compositions having a desirable soft touch feel to skin, and in particular grip, especially during wet, soapy and humid conditions. In one embodiment, the composition is part of a composite system, wherein the composition is connected, for example bonded, molded, overmolded or co-extruded to a substrate, such as a thermoplastic, glass or metal. The compositions and composites are suitable for use wherever desirable feel and grip are needed, such as handles or grips of household or industrial items.

BACKGROUND OF THE INVENTION

Many items, consumer, household and industrial, include grips or handles that are designed to be grasped by the user. Depending on the function of the items, the pressure exerted by the user may vary, but generally it is desirable that a sufficient grasp is maintained so that the handle does not fall out of the user's hand.

Various grips or handles comprise a polymer. Thermoplastic elastomers, especially those with hardness below 75 Shore A, have excellent dry grip and, therefore, are widely being used to overmold onto hard substrates to provide a soft touch surface with excellent grip. When a handle becomes wet during use, such as during the normal use of the item in the case of a cooking utensil or a personal care tool, by normal conditions of use such as rain or humidity, or even sweat from the user, the item's handle can become slippery and difficult to grip.

Moreover, many individuals desire handles that offer a soft feel that is pleasing to touch, as well as handles that have good grip when moist, wet or soapy.

Different attempts have been set forth in order to improve wet grip, including adding polar polymers, such as polyurethane, and adding abrasive filler to make the surface of the item rough.

U.S. Pat. No. 4,871,799 relates to a thermoplastic polymer composition containing (a) a polyester or polyamide thermoplastic polymer and (b) a block graft copolymer which comprises (i) as the backbone portion, at least one of a block copolymer or a hydrogenated block copolymer containing blocks of a styrene-type polymer and blocks of a butadiene-type polymer, and (ii) as the graft portion, a radical disintegrative polymer, said block graft copolymer having been chemically modified with molecular units containing a functional group which will reportedly combine or interact with said thermoplastic polymer a).

U.S. Pat. No. 5,314,940 relates to reportedly high wet-friction, highly adherent, non-abrasive elastomeric compositions reportedly producing smooth, slip-resistant coatings on surfaces, containing as primary components, a thermoplastic rubber block copolymer and a petrolatum, and optionally, independently including a plasticizer such as a hydrogenated polybutene, a tackifier such as polyisobutylene or a hydrocarbon resin, an antioxidant or a UV light absorber, in a carrier organic solvent, and containing no abrasive filler or particulate additives.

U.S. Pat. No. 5,981,649 relates to a rubber composition reportedly suitable for use in grips of articles such as golf clubs, tennis rackets, bicycles and tools, comprising (1) a rubber component containing an ethylene-propylene-diene rubber (EPDM), and (2) 5 to 100 parts by weight of a polyisobutylene having a viscosity average molecular weight of 6,000 to 50,000, which reportedly provides grips having good feeling of touch, good non-slipping properties in both fine and rainy weather, and reportedly giving a small feeling of impact to mis-shot of golf balls as compared with conventional grips.

U.S. Pat. No. 6,060,552 relates to a rubber composition containing a diene rubber and a modified polyisobutylene rubber having a functional group capable of reacting with a silanol group present on a surface of silica, together with a precipitated silica or a silica-adhered carbon black, having a low tan δ (about 0.2) at 60° C., reportedly having an improved grip performance without substantially decreasing the abrasion resistance and the rolling resistance.

U.S. Pat. No. 6,372,855 relates to a modified polybutene (polyisobutylene) containing isobutylene repeating units and having, in the main chain, at the ends, and/or at the side chains of the polymer chain thereof, free radicals stable at a room temperature and in the presence of oxygen, or having a half-ester structure, amide structure, onium salt structure, or imide structure or acid anhydride residual group, as well as a rubber composition containing the same.

U.S. Pat. No. 7,150,919 discloses a thermoplastic elastomer composition which is comprised of (a) a thermoplastic resin selected from the group consisting of polyolefin resin, polyphenylene ether, and polystyrene, wherein the thermoplastic resin is present at a level of up to 60 parts by weight, (b) 5 to 90 parts by weight of a rubbery elastomer, wherein the repeat units in the rubbery polymer are distributed through the rubbery polymer in an essentially random manner, wherein the rubbery polymer is a solution polymer, and is optionally, at least partially crosslinked, (c) 5 to 90 parts by weight of a highly saturated elastomer, and (d) 15 to 600 parts by weight of an oil.

U.S. Publication No. 2004/0059069 discloses that hotmelt adhesive compositions based on a mixture of at least one reactive binder and at least one non-reactive binder are reportedly useful as one- or two-part adhesives and/or sealants, particularly in the production of multiple glazing systems. The reactive binder may be a polyisobutylene, hydrogenated polybutadiene and/or poly-alpha-olefin which has been functionalized with silane groups. The non-reactive binder may be a butyl rubber, poly-.alpha.-olefin, polybutene, styrene block copolymer and/or a diene or homopolymer. The adhesive compositions reportedly act as both a spacer and as a matrix for the moisture-absorbing substances employed in multiple glazing applications, forming an elastic bond or seal at the edges of the glass layers.

U.S. Publication No. 2004/0171759 relates to a polymer composition comprising at least one polyisobutene-containing component based on a medium molecular weight, reactive polyisobutene and at least one further polymer which is different therefrom.

U.S. Publication No. 2006/0223945 relates to synthesis techniques to reportedly form emulsifiers of low color from maleic anhydride and polymers of isobutylene.

U.S. Publication No. 2007/0032320 discloses inflatable sports balls using a particular class of thermoplastic elastomers as an outer cover layer. The class of thermoplastic elastomers reportedly exhibits a particular combination of properties that result in the ball having excellent wet play characteristics.

U.S. Publication No. 2007/0037908 relates to compositions containing improved tackifiers as well as methods making and using the same.

U.S. Publication No. 2008/0005930 relates to a method of reportedly improving the performance of sports shoes, especially soccer boots, by improving the coefficient of friction of key areas of the shoe (such as the toe box and upper) in both wet and dry conditions. Described is the application of butylene type coatings, including polyisobutylene polymers, to maintain desirable existing characteristics of a shoe, such as feel and feedback, but which improve grip. Variations such as patches and areas of specific types of fabric or coating are also discussed.

U.S. Publication No. 2008/0271344 relates to the modification of goat and caprine leathers to render them suitable for use in the manufacture of sports shoes, and certain other items of footwear and apparel. Goatskin, while possessing some desirable properties, has poor wear and tear resistance. The present invention discusses the attachment of specific types of bonding layers to the non-grain face side to reportedly alter the overall performance of caprine leathers so that they may be used in durable footwear. Treatments to, and coatings on, the caprine leather are also discussed.

Japanese Publication No. 200-088219 relates to providing a gasket material which is excellent in properties required of a gasket material, such as low hardness and its compression set is small, and permeability, such as a low-molecular-weight siloxane.

Many tackifiers, such as polyisobutylene, improve grip under dry conditions, and only moderately improve the grip under wet conditions. The product, when containing too much tackifier, is usually sticky and not suitable for use as a grip or handle. In view of the above, it would be desirable to provide a composition suitable for use as a grip or handle or a portion of a grip or handle that has consumer-desirable properties, in particular good grip during wet conditions.

SUMMARY OF THE INVENTION

One object of the present invention is to provide a thermoplastic elastomer composition having desirable feel or texture.

A further object of the present invention is to provide a thermoplastic elastomer composition having desirable grip, especially during wet, soapy, or humid conditions and yet is not sticky when touched.

Still another object of the present invention is to provide a composition having good adherence to a substrate, such as different polymer, glass or a metal.

Yet another object of the present invention is to provide a thermoplastic elastomer composition having a relatively low hardness, a desirable texture and comfort.

Still another object of the present invention is to provide a thermoplastic elastomer composition that can be tinted or colored as desired, for example utilizing pigments, dyes or the like.

A further object of the present invention is to provide a thermoplastic elastomer composition prepared utilizing compression molding, injection molding, extrusion, calendering or other melt processing techniques.

Another object of the present invention is to provide a composite comprising a thermoplastic elastomer composition having a desirable feel or texture operatively connected, for example bonded to a substrate, such as a different polymer or metal.

Yet another object of the present invention is to provide a method for preparing a composite comprising the steps of obtaining a substrate comprising a polymer, glass or metal, or a combination thereof, and molding a thermoplastic elastomer composition to a portion of the substrate, whereby the molded thermoplastic elastomer composition is operatively connected, for example bonded, to the substrate. Examples of molding include overmolding, insert molding and co-extruding.

In one aspect of the present invention, a composition having desirable wet grip properties is disclosed, comprising one or more of a) a styrenic block copolymer comprising at least one hard block (A) derived from at least two aromatic vinyl compound units and at least one soft polymer block (B), wherein the soft polymer block (B) is derived from one or more of olefin monomers and diene monomers, b) a thermoplastic vulcanizate (TPV) and c) an olefin block copolymer, and a polar functional group terminated polyalkenyl.

In another aspect of the present invention, a thermoplastic elastomer composition is disclosed, comprising an elastomer, a polar functional group terminated polyalkenyl and a zeolite, wherein the polar functional group terminated polyalkenyl is present in an amount from about 1 to about 20 parts, and wherein the zeolite is present in an amount from about 5 to about 35 parts, all said parts based on 100 total parts by weight of the composition.

In still another aspect of the present invention, a composite is disclosed, comprising an elastomeric composition connected to a substrate material, the substrate material having a greater hardness than the elastomeric composition, the elastomeric composition comprising one or more of a) a styrenic block copolymer comprising at least one hard block (A) derived from at least two aromatic vinyl compound units and at least one soft polymer block (B), wherein the soft polymer block (B) is derived from one or more of olefin monomers and diene monomers b) a thermoplastic vulcanizate (TPV) and c) an olefin block copolymer, and a polar functional group terminated polyalkenyl.

BRIEF DESCRIPTION OF THE DRAWINGS

The invention will be better understood and other features and advantages will become apparent by reading the Detailed Description of the Invention, taken together with the drawings, wherein:

FIG. 1 is a cross-sectional view of one embodiment of a composite of the present invention including a thermoplastic elastomer composition layer.

DETAILED DESCRIPTION OF THE INVENTION

In one embodiment of the present invention, the thermoplastic elastomer composition includes at least an elastomer, preferably a styrenic block copolymer and a functionalized polyisobutylene, preferably polyisobutylene succinic anhydride. In some embodiments, the thermoplastic elastomer is a vulcanizate.

In further embodiments, the thermoplastic elastomer composition is connected to a substrate, for example by bonding, molding or an adhesive, wherein the substrate can be, for example, one or more of a polymer, glass and metal, thus forming a composite. Referring now to FIG. 1, one embodiment of a composite 10 is illustrated. Therein, a thermoplastic elastomer composition 20 is connected to a portion of a substrate 30.

The thermoplastic elastomer compositions include one or more styrenic block copolymers having a hard block (A) including aromatic vinyl repeat units and at least one soft polymer block (B) containing two or more repeat units, that are the same or different, and independently derived from olefin monomers. The styrenic block copolymer can be, for example, a triblock copolymer (A-B-A); or a tetrablock or higher multiblock copolymer. In a preferred embodiment, the styrenic block copolymer is a triblock copolymer (A-B-A) having two hard blocks.

Each hard polymer block (A) can have two or more same or different aromatic vinyl repeat units. For example, the block copolymer may contain (A) blocks which are styrene/alpha-methylstyrene copolymer blocks or styrene/butadiene random or tapered copolymer blocks so long as a majority of the repeat units of each hard block are aromatic vinyl repeat units. The (A) blocks are preferably aromatic vinyl compound homopolymer blocks. The term "aromatic vinyl" is to include those of the benzene series, such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other monoalkenyl polycyclic aromatic compounds such as vinyl naphthalene, vinyl anthracene and the like. The preferred aromatic vinyl compounds are monovinyl monocyclic aromatics, such as styrene and alpha-methylstyrene, with styrene being most preferred. When three or more different repeat units are present in hard polymer block (A), the units can be combined in any form, such as random form, block form and tapered form.

Optionally, the hard polymer block (A) can comprise small amounts of structural units derived from other copolymerizable monomers in addition to the structural units derived from the aromatic vinyl compounds. The proportion of the structural units derived from other copolymerizable monomers is desirably 30% by weight or less and preferably 10% by weight or less based on the total weight of the hard polymer block (A). Examples of other copolymerizable monomers include, but are not limited to, 1-butene, pentene, hexene, conjugated dienes such as butadiene or isoprene, methyl vinyl ether, and other monomers.

The soft polymer block (B) of the styrenic block copolymer includes two or more same or different structural units. Soft polymer block (B) can be derived from olefin monomers generally having from 2 to about 12 carbon atoms and can include, for example, ethylene, propylene, butylene, isobutylene, etc. When the soft polymer block (B) has structural units derived from three or more repeat units, the structural units may be combined in any form such as random, tapered, block or any combination thereof. In a preferred embodiment, the soft polymer block does not contain any unsaturated bonds.

The styrenic block copolymers may be prepared utilizing bulk, solution or emulsion techniques as known in the art. In a preferred embodiment, the amount of hard block ranges from about 10% to about 40% by weight based on the total weight of the styrenic block copolymer.

Optionally, the soft polymer block (B) can include small amounts of structural units derived from other copolymerizable monomers in addition to the structural units described. In this case, the proportion of the other copolymerizable monomers is generally 30% by weight or less, and preferably 10% by weight or less based on the total weight of the soft polymer block (B) of the styrenic block copolymer. Examples of other copolymerizable monomers include, for example, styrene, p-methylstyrene, α-methylstyrene, and other monomers that can undergo ionic polymerization.

In a preferred embodiment, the styrenic block copolymers are styrene-ethylene/propylene-styrene, styrene-ethylene/ethylene/butylene-styrene, styrene-ethylene/ethylene/propylene-styrene, or a combination thereof. Styrenic block copolymers are available in the art from sources such as Kraton Polymers of Houston, Tex., as Kraton G-1641, G-1642, G-1651, G-1633; Kuraray Co., Ltd. of Tokyo, Japan as SEPTON™ styrenic block copolymers, for example SEPTON™ 4033, 4044, 4055, 8004, 8006 and TSRC Corporation of Taiwan as Taipol 6151, 6154.

In additional embodiments of the present invention, the styrenic block copolymer can have at least one soft polymer block (B) including two or more repeat units that are the same or different, independently derived from one or more of an olefin monomer and a diene monomer. When the diene monomer is present, the styrenic block copolymer is preferably hydrogenated. The conjugated diene monomers preferably contain from 4 to about 8 carbon atoms with examples including, but not limited to, 1,3-butadiene (butadiene), 2-methyl-1,3-butadiene (isoprene), 2,3-dimethyl-1,3-butadiene, 1,3-pentadiene (piperylene), 1,3-hexadiene, and the like. Therefore, in one embodiment, the soft polymer block (B) can have structural units derived from one or more of an olefin monomer(s) and diene monomer(s). As indicated hereinabove, when the soft polymer block (B) has structural units derived from three or more repeat units, the structural units may be combined in any form.

As indicated hereinabove, in one embodiment of the present invention, the elastomer composition is a thermoplastic vulcanizate which is produced via dynamically vulcanizing an unsaturated rubber, such as ethylene propylene diene copolymer (EPDM), in the presence of crosslinking agent and thermoplastic polymer, such as polypropylene. The dynamical vulcanization is generally performed at a temperature from about 160° C. to about 290° C., and preferably from about 200° C. to about 250° C. Vulcanization time generally depends upon the particular processing equipment utilized and components of the composition.

The crosslinking agent is not particularly limited to any crosslinking agent so long as it can act upon the crosslinkable units in the elastomer or rubber and thereby form crosslinks. One or two or more crosslinking agents can be utilized to achieve desired performance. A crosslinking agent can be appropriately selected in view of the activity depending upon processing conditions such as processing temperature and processing time during dynamic vulcanization. Examples of suitable crosslinking agents include, but are not limited to, bismaleimide compounds and organic peroxides, phenolic resin, and hydrosilane.

Examples of suitable bismaleimide compounds include, but are not limited to, N,N'-m-phenylene bismaleimide, N,N'-p-phenylene bismaleimide, N,N'-p-phenylene (1-methyl) bismaleimide, N,N'-2,7-naphthene bismaleimide, N,N'-m-naphthene bismaleimide, N,N'-m-phenylene-4-methyl bismaleimide, N,N'-m-phenylene (4-ethyl) bismaleimide, and tolylene bismaleimide. N,N'-m-phenylene bismaleimide is preferred from the viewpoint of reactivity.

Examples of suitable organic peroxides include, but are not limited to, dicumyl peroxide, di-t-butyl peroxide, 2,5-dimethyl-2,5-di(t-butylperoxy)hexane, 2,5-dimethyl-2,5-di(t-butylperoxy)hexyne-3,1,3-bis(t-butylperoxyisopropyl) benzene, 3,3,5, 7,7-penta-methyl, 2,4-trioxepane, and t-butyl cumyl peroxide. 3,3,5,7,7-pentamethyl-1,2,4-trioxepane compound is preferred from the viewpoint of higher decomposition temperature.

Crosslinking activators or coagents can be optionally utilized if desired by the processor. Such co-agents include, for example, triallyl isocyanurate, divinylbenzene, ethylene glycol dimethacrylate, triethylene glycol dimethacrylate, and other polyfunctional monomers or oligomers or polymers.

The amount of crosslinking agent or one or more crosslinking agents in the composition ranges generally from about 0.01 to about 20 parts, desirably from about 0.1 to about 10 parts, and preferably from about 0.1 to about 5 parts per 100 parts by weight of the unsaturated rubber, such as ethylene propylene diene copolymer.

The thermoplastic vulcanizate is preferably EPDM/polypropylene based TPV, commercially available from various producers, such as Teknor Apex Company as Uniprene®, Exxon Mobile as Santoprene®, and DSM Thermoplastic Elastomers as Sarlink®.

In a further embodiment of the present invention, the thermoplastic elastomer composition comprises an olefin block copolymer (OBC). Olefin block copolymers provide a balance of flexibility and high temperature resistance as well as desirable elastic recovery and compression set properties at both ambient and elevated temperatures. Improved abrasion resistance can also be achieved utilizing olefin block copolymers. The olefin block copolymer contains therein two or more, and preferably three or more segments or blocks. Generally olefins having from 2 to about 12 carbon atoms and preferably from about 2 to about 8 carbon atoms are utilized. The olefin block copolymers can comprise alternating blocks of hard and soft segments. As known in the art, catalytic shuttling technology allows variable yet controllable distribution of block lengths to be produced. Olefin block copolymers are available for example DOW as INFUSE™. Further descriptions of olefin block copolymers are set forth in WO 2005/090425, WO 2005/090427 and WO 2005/090426 herein fully incorporated by reference.

In one embodiment, the styrenic block copolymer or thermoplastic vulcanizate (TPV) or olefin block copolymer, or any combination thereof is present in an amount from about 10 to about 80 parts, and preferably from about 15 to about 40 or about 65 parts by weight per 100 parts by weight of the thermoplastic elastomer composition.

The thermoplastic elastomer composition also includes a polar functional group terminated polyalkenyl (PFGTA), preferably polyisobutylene. The polar functional group is preferably derived from a carboxylic acid anhydride. In a preferred embodiment, the polar functional group terminated polyalkenyl is polyisobutylene succinic anhydride. It is believed that the presence of the polar functional group terminated polyalkenyl in the thermoplastic elastomer composition improves water wetability of the composition and increases surface energy.

Polar functional group terminated polyalkenyls, such as polyalkenyl succinic anhydride, can be produced utilizing many different conventional processes. For purposes of simplicity, reference is made to processes for preparing polyisobutylene succinic anhydride (PIBSA); however, the disclosure is intended to relate to processes for the production of all hydrocarbyl polyalkenyl/acid compounds and not just PIBSA.

One process involves direct thermal condensation reaction between maleic anhydride and polyisobutylene and is often referred to in the art as a "thermal ene" reaction. In the thermal ene reaction, a carbon/carbon bond is formed between an alpha-carbon on the unsaturated organic acidic reagent and a vinylic carbon at a terminus of the polyalkene. Sustained exposure to elevated temperatures above 150° C. is preferred to obtain good reaction yields, usually for a time period ranging from about 1 to about 48 hours.

A second type of process utilizes chlorination of the PIB, followed by condensation of the chlorinated PIB with maleic anhydride. The process can be carried out at a lower temperature than the thermal ene reaction process, with high yield and without formation of substantial amounts of sediment.

An additional process for the preparation of polyalkenyl succinic anhydrides is set forth in U.S. Application Publication No. 2008/0188385, herein fully incorporated by reference.

The polar functional group terminated polyalkenyls preferably have a molecular weight of about 500 to 50,000 and preferably from about 750 to about 3000, weight average. The polar functional group terminated polyalkenyls, preferably PIBSA, is present in the thermoplastic elastomer composition in amounts generally from about 1 to about 20 parts, and preferably from about 3 to about 15 parts based on 100 parts by weight of the total composition. The polar functional group terminated polyalkenyl are available from numerous sources including BASF of Ludwigshafen, Germany as Glissopal® SA (PIBSA), Lubrizol of Wickliffe, Ohio as Lubrizol 27000 and Lubrizol LZ8668D, Chevron Oronite Company of San Ramon, Calif. as OLOA 15500.

In a further embodiment of the present invention, the thermoplastic elastomer composition includes one or more zeolites. Zeolites are porous alumino-silicate minerals that may be either a natural or manmade material. Accordingly, when utilized herein, the term "zeolite" includes are natural and man-made forms of zeolite. Zeolites are generally comprised of a three-dimensional framework of $SiO_4$ and $AlO_4$ in tetrahedron form that creates a relatively high surface area. Zeolites can accommodate a wide variety of cations, such as, but not limited to, sodium, potassium, magnesium, calcium, strontium, lithium, barium, ammonium, $CH_3NH_3$, $(CH_3)_3NH$, $(CH_3)_4N$, Ga, Ge and P. It is believed that the zeolites beneficially impart greater polarity to the composition. It is also believed that the zeolites have the ability to make the compositions less sticky and thus provide a desirable feel, especially wet grip. Further, it is believed that the zeolites synergistically interact with the PFGTA to form compositions having desirable wet grip properties.

Zeolites for use in the compositions of the present invention include, but are not limited to, Zeolite A, Zeolite X, Zeolite Y, Zeolite Z5MS, amicite, analcime, barrerite, bellbergite, bikitaite, boggsite, brewsterite, chabazite, clinoptilolite, cowlesite, dachiardite, edingtonite, epistilbite, erionite, faujasite, ferrierite, garronite, gismondine, gmelinite, gobbinsite, gonnardite, goosecreekite, harmotome, herchelite, heulandite, laumontite, levyne, maricopaite, mazzite, merlinoite, mesolite, montesommaite, mordenite, natrolite, offretite, paranatrolite, paulingite, pentasil, perlialite, phillipsite, pollucite, scolecite, sodalite, sodium dachiardite, stellerite, stilbite, tetranatrolite, thomsonite, tschernichite, wairakite, wellsite, willhendersonite and yugawaralite.

When the zeolites are present in the thermoplastic elastomer compositions of the present invention, the amount thereof ranges generally from about 1 to about 35 parts, and preferably from about 5 to about 25 or 35 parts by weight based on 100 total parts by weight of the composition. The zeolites are available from numerous sources including PQ Corp of Valley Forge, Pa. as VALFOR 100, ADVERA 401, ADVERA 401F, ADVERA 401P, ADVERA 401PS, Zeolyst International of Conshohochen, Pa. as Zeolite Y, Zeolite Beta, Bordenite, ZSM-5 and Ferrierite.

If desired, the compositions of the present invention can further include fillers such as inorganic fillers. Examples of inorganic fillers for use in the thermoplastic elastomer compositions include, but are not limited to, one or more of calcium carbonate, talc, clay, silica, titanium dioxide, carbon black, barium sulfate, mica, glass fibers, whiskers, carbon fibers, magnesium carbonate, glass powders, metal powders, kaolin, graphite, and molybdenum disulfide. The thermoplastic elastomer compositions may also include light stabilizers, pigments, heat stabilizers, anti-stat agents, anti-oxidants, processing aids, flame retardants, or the like. The optional components, independently, can be utilized within ranges not adversely affecting the performance of the compositions.

Compositions of the present invention in various embodiments include a softener such as a mineral oil softener, or synthetic resin softener, a plasticizer, or combinations thereof. The softener can beneficially reduce the temperatures at which the compositions are processable. Oil softeners are generally mixes of aromatic hydrocarbons, naphthene hydrocarbons and paraffin, i.e., aliphatic, hydrocarbons. Those in which carbon atoms constituting paraffin hydrocarbons occupy 50% by number or more of the total carbon atoms are called "paraffin oils". Those in which carbon atoms constituting naphthene hydrocarbons occupy 30 to 45% by number of the total carbon atoms are called "naphthene oils", and those in which carbon atoms constituting aromatic hydrocarbons occupy 35% by number or more of the total carbon atoms are called "aromatic oils". In one embodiment, paraffin oils and/or plasticizers are preferably utilized as a softener in compositions of the present invention. Examples of synthetic resin softeners include, but are not limited to, polyisobutylene, polybutenes and low molecular weight polybutadienes. When present, the softeners range in an amount from about 1 to about 50 parts, and preferably from about 15 to about 40 parts by weight based on 100 total parts by weight of the composition.

In a further embodiment, the thermoplastic elastomer compositions include organic fillers or organic-derived fillers. Examples of suitable organic or organic-derived fillers include, but are not limited to, starch, thermoplastic starch, cellulose fiber, wood flower, rice husk and leather powder. Starch can refer to any starch of natural origin, whether processed, chemically modified or treated, including starches such as, but not limited to, wheat starch, corn starch, potato starch and rice starch. Starch can also be derived from other plant sources such as, but not limited to, cassava, tapioca and pea.

Starch further includes modified starches, such as chemically treated and crosslinked starches, and starches in which the hydroxyl groups have been substituted with organic acid, to provide esters or organic alcohols to provide ethers. Starch also includes extended starches, such as those extended with proteins, for example with soya protein.

The organic or organic-derived fillers when present are generally in an amount from about 1 to about 35 parts, and preferably from about 1 to about 25 parts based on 100 total parts by weight of the composition. Thermoplastic starch is available from numerous sources including Teknor Apex of Pawtucket, R.I. as MP-70000A, Cerestech of Montreal, Quebec, Canada as Cereloy™ Eco PP and Cereloy™ Eco HD.

The thermoplastic elastomer compositions further optionally include polyolefins comprising amorphous or crystalline homopolymers or copolymers of two or more different monomers derived from alpha-monoolefins having from 2 to about 12 carbon atoms, and preferably from 2 to about 8 carbon atoms. Examples of suitable olefins include ethylene, propylene, 1-butene, 1-pentene, 1-hexene, 2-methyl-1-propene, 3-methyl-1-pentene, 4-methyl-1-pentene, 5-methyl-1-hexene, and combinations thereof. Polyolefins include, but are not limited to, low density polyethylene, high-density polyethylene, linear-low-density polyethylene, poly-propylene (isotactic and syndiotactic), ethylene/propylene copolymers, and polybutene, and olefinic block copolymers. Polyolefin copolymers can also include the greater part by weight of one or more olefin monomers and a lesser amount of one or more non-olefin monomers such as vinyl monomers including vinyl acetate, or a diene monomer, EPDM, etc. Generally, a polyolefin copolymer includes less than about 30 weight percent of a non-olefin monomer, desirably less than 20 weight percent, and preferably less than about 10 weight percent of a non-olefin monomer.

Polyolefin polymers and copolymers are commercially available from sources including, but not limited to, Chevron, Dow Chemical, DuPont, Exxon Mobil, Huntsman Polymers, Ticona and Westlake Polymer under various designations.

When present, polyolefins are utilized in an amount generally from about 1 to 25 parts, and preferably from about 1 to about 15 parts by weight per 100 total parts by weight of the composition.

The thermoplastic elastomer compositions disclosed have a coefficient of friction against a smooth stainless steel surface from 1.5 to 2.5 under dry conditions and 1.3 to 2.4 under wet conditions, tested according to the procedure set forth below. The hardness of these compositions are 8 A to 40 A, and more preferably 15 A to 30 A (ASTM-D2240). Most importantly, the hand grip rating of 4 to 5 (1 being slippery and 5 being easy to grip) under dry conditions and 3 to 5 even under wet conditions as described below.

The substrate to which the thermoplastic elastomer composition can be connected or bonded, can be formed from a variety of one or more compounds, for example a polymer, glass or metal. The substrate generally has a greater hardness than the thermoplastic elastomer composition. Examples of suitable substrate polymers include, but are not limited to, polyolefins, for example polyethylene and polypropylene, cycloolefin copolymers, polyamides, polyimides, polyacetals, polyesters, polyurethanes, polymethylacrylates, polymethylmeth-acrylates, polylactic acids, polyphenylene oxides, polyphenylene sulfides, polysulfones, polyvinylchloride, polycarbonate, polystyrene, styrene copolymers such as styrene-acrylonitrile copolymers, acrylonitrile-butadiene-styrene copolymer (ABS), and thermosets of unsaturated polyesters, vinyl esters, phenolic resins, epoxy resins, melamine resins, etc.

The thermoplastic elastomer composition of the present invention can be formed by blending the desired components in one or more steps, preferably by mixing. The composition is preferably heated to obtain a melted composition, preferably with mixing, to substantially disperse the components thereof. Melt blending is performed at a temperature generally from about 165° C. to about 240° C., and preferably from about 170° C. to about 210° C. The compositions can be prepared for example in a banbury, in a two roll mill, a continuous mixer such as single screw or twin screw extruder, a kneader or any other mixing machine as known to those of ordinary skill in the art. After preparation of the compositions, they can be pelletized or diced utilizing appropriate equipment, if desired. Alternatively, the compositions can be directly molded or shaped as desired.

The composites of the present invention comprising a substrate and the thermoplastic elastomer composition can be formed by connecting the thermoplastic elastomer composition to the substrate utilizing any desired method, for example overmolding or insert molding, or co-extruding, or even an adhesive. Overmolding generally involves bonding the thermoplastic elastomer composition to a polymeric substrate utilizing a two-shot or multi-shot injection molding process or a co-injection molding process. Overmolding generally requires a special injection molding machine that is equipped with two or more barrels, allowing two or more materials to be shot into the same mold during the same molding cycle. Overmolding allows for example, reduced cycle times, superior part quality, and reduced labor costs.

As known in the art, insert molding comprises inserting a pre-molded or pre-formed substrate into a mold and the thermoplastic elastomer composition is molded directly over or to at least a portion of the insert. One advantage of insert molding is that conventional single-shot injection molding machines can be used and costs associated with insert molding are generally lower than with overmolding.

The thermoplastic elastomer compositions of the present invention can also be processed by one or more of an extrusion and injection molding process in order to form the structure such as a sleeve that can be bonded onto the substrate as desired.

The thermoplastic elastomer compositions of the invention can be utilized wherever desirable feel and grip are needed, such as handles or grips of household or industrial items. Examples of suitable items include, but are not limited to, shaving razors, toothbrushes, writing utensils such as pens or pencils, brushes such as paint brushes and hair brushes, air dryers, tools, for example screwdrivers, hammers, wrenches, pliers and saws, kitchen appliances, for example handles for refrigerators, ovens, microwaves, dishwashers, kitchen utensils, such as spoons, forks, knives, spatulas, can openers, bottle openers, corkscrews, whisks and vegetable peelers, vacuum cleaner handles, brooms, mops, rakes, shovels, scissors, sporting equipment, such as fishing poles, firearms, tennis rackets, and golf clubs. The thermoplastic elastomer compositions of the invention can also be coated on fabric, such as making wet grip gloves, non-skid fabrics, etc.

The present invention is illustrated in further detail by the following Examples, which are not intended to limit the scope of the invention or the manner in which it can be practiced. Unless indicated otherwise, parts and percentages are weight based.

The Examples listed below were prepared in a Leistriz 30 mm co-rotating twin screw extruder. All ingredients were premixed to a uniform, free-flowing state and then fed to the main feed throat. The extrusion temperature was 200° C. and the extruder screw speed was 180-350 RPM. Samples from the twin screw extruder were then injection molded into plaques approximately 2 mm thick, 6.0 cm wide by 8.75 cm long.

Coefficient of Friction (COF) Measurement:

Injection molded plaques were cut 2.38 mm wide by 7.62 cm long. The cut specimens were mounted onto a steel sled using double sided tape. The weight of the steel sled was 2290 g. The sample was loaded at the smooth polished bottom of a stainless steel tray (21 cm wide, 57.5 cm long and 2.5 cm deep). Pulling force was measured against the smooth stainless steel surface under dry conditions, under wet conditions (with the tray filled with 0.5 cm deep water), as well as under soapy/water conditions (with the try filled with 0.5 cm deep liquid soap/water solution). The liquid soap was a Softsoap® Antibacterial Handsoap from Colgate-Palmolive of New York. The soap/water solution was made up with 1 part of the liquid soap and 30 parts of deionized water. Coefficient of friction was calculated according to the following equation:

COF=Pulling Force(g)/2290 (g)

Hand Grip Rating

A panel of 4-10 people participated in rating the hand grip "as is" and with the water. The rate of 1 was given to a slippery surface and 5 was given to a non-slippery or grip surface. The rate of each sample was the average from all participants for the particular example.

TABLE 1

| Formulation (by wt. %) | Comparative Example A | Comparative Example B | Example C | Example D | Example E | Example F |
|---|---|---|---|---|---|---|
| Styrenic Block Copolymer[A] | 36.485 | 49.440 | 33.67 | 28.49 | 28.116 | 25.282 |
| PFGTA[B] | — | — | 15.46 | 11.40 | 11.248 | 10.112 |
| Softener | 37.674 | 50.410 | 33.00 | 28.49 | 26.710 | 24.017 |
| Polypropylene | 7.297 | — | 2.70 | 2.85 | 2.7000 | 2.528 |
| Zeolite | — | — | — | — | 15.463 | 13.904 |
| Inorganic Filler | 18.242 | — | 14.87 | 28.49 | 15.463 | 13.904 |
| Stabilizer (Antioxidant) | 0.302 | 0.150 | 0.30 | 0.280 | 0.300 | 0.253 |
| Organic Filler[C] | — | — | — | — | — | 10.000 |
| Total Weight | 100% | 100% | 100% | 100% | 100% | 100% |
| PROPERTIES | | | | | | |
| Surface Tackiness | Not Tacky | Not Tacky | Very Sticky | Not Tacky | Not Tacky | Not Tacky |
| Shore A Hardness (ASTM-D2240) (5 sec. delayed) | 32.0 | 30.0 | 21.0 | 25.0 | 24.0 | 28.0 |
| Coefficient of Friction on Stainless Steel Surface under Dry Conditions | 1.8 | 2.0 | 2.1 | 2.2 | 2.1 | 2.1 |
| Coefficient of Friction on Stainless Steel Surface under Wet Conditions | 1.4 | 1.7 | 2.1 | 1.8 | 1.9 | 1.8 |
| Coefficient of Friction on Stainless Steel Surface under Soap/Water Conditions | 0.38 | 0.61 | 1.2 | 0.71 | 1.2 | 1.2 |
| Dry Hand Grip Rating | 5 | 4 | 5 | 5 | 5 | 5 |
| Wet Hand Grip Rating | 2 | 1 | 4 | 3 | 4 | 4 |

[A]SEBS
[B]PIBSA
[C]Thermoplastic Starch

TABLE 2

|  | Example G | Example H | Example I | Example J |
|---|---|---|---|---|
| Formulation (by wt. %) | | | | |
| Styrenic Block Copolymer[4] | — | 14.241 | — | 14.245 |
| TPV[D] | 61.710 | 31.646 | — | — |
| OBC | — | — | 42.735 | 28.490 |
| PFGTA[B] | 12.658 | 12.658 | 11.395 | 11.395 |
| Softener | — | 15.823 | 14.245 | 14.245 |
| Zeolite | 17.405 | 17.405 | 15.670 | 15.670 |
| Inorganic Filler | 7.911 | 7.911 | 15.670 | 15.670 |
| Stabilizer (Antioxidant) | 0.316 | 0.316 | 0.285 | 0.285 |
| Total Weight | 100% | 100% | 100% | 100% |
| PROPERTIES | | | | |
| Surface Tackiness | Not Tacky | Not Tacky | Not Tacky | Not Tacky |
| Shore A Hardness (ASTM-D2240) (5 sec. delayed) | 30.0 | 16 | 28 | 27 |
| Coefficient of Friction on Stainless Steel Surface under Dry Conditions | 1.5 | 1.8 | 2.1 | 1.9 |
| Coefficient of Friction on Stainless Steel Surface under Wet Conditions | 1.4 | 1.8 | 1.8 | 1.6 |
| Coefficient of Friction on Stainless Steel Surface under Soap/Water Conditions | 0.69 | 0.75 | 0.75 | 0.67 |
| Dry Hand Grip Rating | 5 | 5 | 5 | 5 |
| Wet Hand Grip Rating | 4 | 4 | 4 | 4 |

[D]45 Shore A hardness Uniprene TPV

In accordance with the patent statutes, the best mode and preferred embodiments have been set forth; the scope of the invention is not limited thereto, but rather by the scope of the attached claims.

What is claimed is:

1. An elastomeric composition having desirable wet grip properties, comprising:
    a styrenic block copolymer comprising at least one hard block (A) derived from at least two aromatic vinyl compound units and at least one soft polymer block (B), wherein the soft polymer block (B) is derived from one or more of olefin monomers and diene monomers;
    a polar functional group terminated polyalkenyl, wherein the polar functional group terminated polyalkenyl is present in an amount from about 1 to about 20 parts per 100 parts by weight of the composition; wherein the polar functional group terminated polyalkenyl comprises polyisobutylene succinic anhydride and
    a zeolite present in an amount from about 5 to about 35 parts based on 100 total parts by weight of the composition.

2. The composition according to claim 1, wherein the total amount of said styrenic block copolymer is from about 10 to about 80 parts per 100 parts by weight of the composition.

3. The composition according to claim 2, wherein the total amount of said styrenic block copolymer is from about 15 to about 65 parts per 100 parts by weight of the composition, and wherein the polar functional group terminated polyalkenyl is present in an amount from about 3 to about 15 parts per 100 parts by weight of the composition.

4. The composition according to claim 1, wherein the composition further includes a softener, inorganic filler and a polyolefin polymer or copolymer.

5. The composition according to claim 1, wherein the composition further includes an organic filler in an amount from about 1 to about 35 parts based on 100 total parts by weight of the composition.

6. The composition according to claim 5, wherein the organic filler comprises thermoplastic starch.

7. An elastomeric composition, comprising:
    an elastomer, polar functional group terminated polyalkenyl and a zeolite, wherein the polar functional group terminated polyalkenyl is present in an amount from about 1 to about 20 parts, wherein the polar functional group terminated polyalkenyl comprises polyisobutylene succinic anhydride, and wherein the zeolite is present in an amount from about 5 to about 35 parts, all said parts based on 100 total parts by weight of the composition.

8. The composition according to claim 7, wherein the polar functional group terminated polyalkenyl is present in an amount from about 3 to about 15 parts, and wherein the zeolite is present in an amount from about 5 to about 25 parts, all said parts based on 100 total parts by weight of the composition.

9. The composition according to claim 7, wherein the elastomer comprises a) a styrenic block copolymer comprising at least one hard block (A) derived from at least two aromatic vinyl compound units and at least one soft polymer block (B), wherein the soft polymer block (B) is derived from one or more of olefin monomers and diene monomers, b) a thermoplastic vulcanizate or c) an olefin block copolymer.

10. The composition according to claim 9, wherein the composition further includes a softener, inorganic filler and a polyolefin polymer or copolymer.

11. The composition according to claim 10, wherein the elastomer comprises the thermoplastic vulcanizate, wherein the thermoplastic vulcanizate is derived from an unsaturated rubber, a thermoplastic polymer, and a crosslinking agent.

12. A composite, comprising:
    an elastomeric composition connected to a substrate material, the substrate material having a greater hardness than the elastomeric composition, the elastomeric composition comprising a styrenic block copolymer comprising at least one hard block (A) derived from at least two aromatic vinyl compound units and at least one soft polymer block (B), wherein the soft polymer block (B) is derived from one or more of olefin monomers and diene monomers, wherein the polar functional group terminated polyalkenyl is present in an amount from about 1 to about 20 parts per 100 parts by weight of the composition; wherein the polar functional group terminated polyalkenyl comprises polyisobutylene succinic anhydride and a zeolite present in an amount from about 5 to about 35 parts based on 100 total parts by weight of the composition.

13. The composite according to claim 12, wherein the substrate comprises one or more of a polymer, glass and a metal.

14. The composite according to claim 13, wherein the total amount of said styrenic block copolymer is from about 10 to about 80 parts per 100 parts by weight of the composition.

15. The composite according to claim 12, wherein the composition further includes a softener, inorganic filler and a polyolefin polymer or copolymer.

16. The composite according to claim 12, wherein said styrenic block copolymer is present in an amount from about 15 to about 45 parts per 100 parts by weight of the composition.

* * * * *